United States Patent
Yanagi

(10) Patent No.: US 10,847,779 B2
(45) Date of Patent: Nov. 24, 2020

(54) FILM-COVERED BATTERY PRODUCTION METHOD AND FILM-COVERED BATTERY

(71) Applicant: Envision AESC Japan Ltd., Zama (JP)

(72) Inventor: Takahiro Yanagi, Kanagawa (JP)

(73) Assignee: Envision AESCH Japan Ltd., Zama (JP)

( * ) Notice: Subject to any disclaimer, the term of this patent is extended or adjusted under 35 U.S.C. 154(b) by 0 days.

(21) Appl. No.: 16/467,509

(22) PCT Filed: Dec. 9, 2016

(86) PCT No.: PCT/JP2016/086681
§ 371 (c)(1),
(2) Date: Jun. 7, 2019

(87) PCT Pub. No.: WO2018/105096
PCT Pub. Date: Jun. 14, 2018

(65) Prior Publication Data
US 2020/0044229 A1    Feb. 6, 2020

(51) Int. Cl.
*H01M 2/36* (2006.01)
*H01M 2/02* (2006.01)
*H01M 2/08* (2006.01)

(52) U.S. Cl.
CPC ......... *H01M 2/365* (2013.01); *H01M 2/0202* (2013.01); *H01M 2/08* (2013.01)

(58) Field of Classification Search
CPC ........ H01M 2/02; H01M 2/0202; H01M 2/06; H01M 2/08; H01M 2/365; H01M 10/056
See application file for complete search history.

(56) References Cited

U.S. PATENT DOCUMENTS 7,270,913 B2 *  9/2007  Sugiyama ............. H01M 2/021
                                               429/177

FOREIGN PATENT DOCUMENTS

| JP | 2001-102090 A | 4/2001 |
| JP | 2003-297324 A | 10/2003 |
| JP | 2006-147230 A | 6/2006 |
| JP | 2010-49913 A | 3/2010 |
| JP | 2010-244725 A | 10/2010 |
| JP | 2013-140782 A | 7/2013 |
| JP | 2015-37047 A | 2/2015 |
| WO | 2014/188774 A1 | 11/2014 |

* cited by examiner

*Primary Examiner* — Anca Eoff
(74) *Attorney, Agent, or Firm* — Global IP Counselors, LLP

(57) ABSTRACT

A method is performed to produce a film-covered battery in which electrode tabs extend out from joining surfaces on a first side of lamination films, in which a seal line is formed along the first side and traversing the electrode tabs. Pressure and/or heat is applied only to tab regions of the seal line using tab-region heat blocks, and then pressure and/or heat is applied only to non-tab regions using non-tab-region heat blocks.

13 Claims, 10 Drawing Sheets

FILM-COVERED BATTERY PRODUCTION METHOD AND FILM-COVERED BATTERY

CROSS-REFERENCE TO RELATED APPLICATIONS

This application is a U.S. national stage application of International Application No. PCT/JP2016/086681, filed on Dec. 9, 2016.

BACKGROUND

Technical Field

This invention relates to a method for producing a film-covered battery so that a power generation element is housed together with a liquid electrolyte in a casing made of flexible lamination films, and in particular relates to an improvement in a sealing step in which the lamination films are thermally fused while electrode tabs that protrude from the power generation element are held by the lamination films on both sides.

Background Information

Flat film-covered batteries are known as examples of lithium ion secondary batteries. In a film-covered battery, a power generation element in which a plurality of positive electrodes and negative electrodes are layered with a separator interposed therebetween is housed together with a liquid electrolyte in a casing made of lamination films provided with a thermal fusion layer. In this type of film-covered battery, two lamination films are thermally fused in a configuration in which positive and negative electrode tabs composed of thin metal plates are held on both sides by joining surfaces on one side of the casing from which the electrode tabs extend out from, as disclosed in Japanese Laid-Open Patent Application No. 2010-244725 (Patent Citation 1).

In Patent Citation 1, the entire side of the casing from which the electrode tabs extend out from is thermally fused by a first heat block, and only areas adjacent to the electrode tabs are then heated and pressed by a second heat block to fill in gaps adjacent to the electrode tabs.

Specifically, in a sealing step performed using the first heat block, areas where the lamination films are joined together without any interposed electrode tabs and areas with interposed electrode tabs are both heat-sealed at the same time by the same heat block.

However, the metal electrode tabs have high thermal capacity and are connected to the power generation element inside the casing. Heat is therefore transferred from the electrode tabs to the metal current collectors of the positive and negative electrodes. Suitable temperature conditions and/or pressure conditions are therefore different from each other in the areas where the lamination films are joined together without the interposed electrode tabs and the areas that have the interposed electrode tabs on the side being heat-sealed. The result is that the conventional method of applying heat and/or pressure and thermally fusing both areas using the same heat block fails to always seal the areas under optimal conditions and leads to reduced sealing quality.

SUMMARY

The method presented in this disclosure comprises separately performing the following steps: a tab-region sealing step in which regions superposed onto electrode tabs are heat-sealed using tab-region heat blocks, the regions being disposed partway along a seal line continuously set across the electrode tabs on a side of the casing where at least one of the electrode tabs is disposed; and a non-tab-region sealing step in which regions not superposed onto the electrode tabs are heat-sealed using non-tab-region heat blocks, the regions being disposed partway along the seal line.

Heat sealing these two regions separately in this manner makes it possible to individually optimize individual processing conditions (for example, temperature and/or pressure, heating time, etc.).

This improves sealing quality on the side of the casing that includes electrode tabs.

DETAILED DESCRIPTION OF THE EMBODIMENTS

Selected embodiment are described in detail below on the basis of the drawings.

Figure 1:
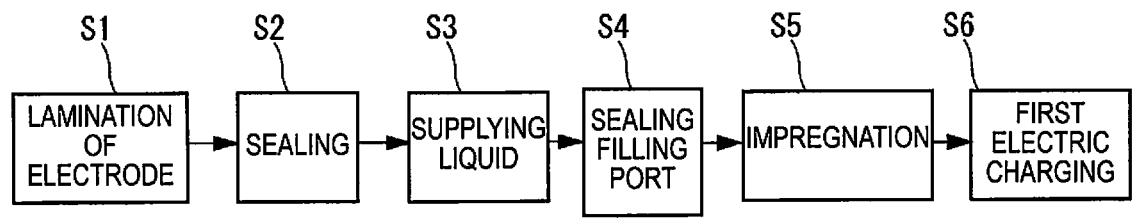
FIG. 1 is a process diagram illustrating the main steps of a method for producing a battery according to a one embodiment.

FIG. 1 is a process diagram illustrating the main steps of a method for producing a battery according to one embodiment. This embodiment considers a flat film-covered lithium ion secondary battery as a film-covered battery that constitutes part of a vehicle-driving power supply pack for an electric vehicle, a hybrid vehicle, or the like. The film-covered battery according to this working example is configured substantially identically to that disclosed in Japanese Laid-Open Patent Application No. 2013-140782, Japanese Laid-Open Patent Application No. 2015-37047, etc., and constitutes a power generation element (also referred to as a "layered electrode assembly") obtained by layering a plurality of positive electrodes and negative electrodes configured as square sheets using an interposed separator. The power generation element is housed together with a liquid electrolyte in a bag-shaped casing made of lamination films. In the following description of this working example, the battery resulting after the power generation element has been housed in the film-shaped casing is referred to simply as a "cell," irrespective of the production steps involved.

A step shown as step S1 involves layering the electrodes that constitute the power generation element. In this step, positive electrodes, negative electrodes, and a separator that are each wound into roll shapes are layered in sequence while being cut into square sheet shapes. This forms a power generation element, i.e., a layered electrode assembly in which the plurality of positive electrodes and negative electrodes are layered with the separator interposed therebetween. The positive electrodes are obtained by preparing a positive-electrode active material into a binder-containing slurry and applying the slurry to both surfaces of an aluminum foil that serves as a current collector, and then drying and rolling the aluminum foil to form an active-material layer that has a prescribed thickness. The negative electrodes are similarly obtained by preparing a negative-electrode active material into a binder-containing slurry and applying the slurry to both surfaces of a copper foil that serves as a current collector, and then drying and rolling the copper foil to form an active-material layer that has a prescribed thickness. The function of the separator is to hold the liquid electrolyte at the same time as preventing short circuiting between the positive electrodes and negative electrodes. The separator is composed of, e.g., a non-woven fabric or a microporous film of a synthetic resin such as polyethylene (PE) or polypropylene (PP).

The positive electrodes, negative electrodes, and separator layered in a prescribed number of layers are secured by a tape to form the power generation element, i.e., the layered electrode assembly. End parts of the current collectors of the plurality of positive electrodes are superposed onto each other, and an electrode tab serving as a positive terminal, i.e., a positive electrode tab is ultrasonically welded. Similarly, end parts of the current collectors of the plurality of negative electrodes are superposed onto each other, and an electrode tab serving as a negative terminal, i.e., a negative electrode tab is ultrasonically welded. The positive electrode tab is composed of a thin band-shaped aluminum plate, and the negative electrode tab is composed of a thin band-shaped copper plate. Specifically, the electrode tabs are configured from the same metals as the corresponding current collectors.

In a sealing step shown as a subsequent step S2, the power generation element thus configured is disposed in a flexible film-shaped casing. The casing is made of, e.g., lamination films having a four-layer structure in which a thermal fusion layer composed of polypropylene is laminated on an inner side of an aluminum foil, and in which a polyamide resin layer and a polyethylene terephthalate resin layer are laminated as protective layers on an outer side. An overall thickness of the lamination films is, e.g., about 0.15 mm. In this working example, the casing forms a two-part structure having one lamination film disposed on a bottom side of the power generation element and another lamination film disposed on a top side, and the power generation element is disposed between these two lamination films. Four peripheral sides of the structure are superposed and thermally fused together so that an injection port remains in one side. The casing is therefore configured as a bag in which the injection port is opened. The positive electrode tab and negative electrode tab are positioned on sides facing laterally when the side provided with the injection port faces upward. The positive electrode tab and negative electrode tab extend out from joining surfaces of the lamination films. This sealing step is described in greater detail below.

In another example, the casing can be formed in a configuration in which a single comparatively large lamination film is folded in half and a power generation element is sandwiched between the two halves. In this case, three sides are thermally fused so that an injection port remains in one side.

The cell configured so that the power generation element is thus housed in the film-shaped casing in the sealing step is then conveyed to a liquid supply step shown as step S3. In the liquid supply step, the cell is placed upright in a depressurizing chamber or the like, a liquid supply nozzle of a dispenser is inserted into the injection port of the casing at a prescribed reduced pressure, and the cell is filled (supplied) with a liquid electrolyte.

After the supplying of the liquid electrolyte is complete, the injection port is sealed by thermal fusion in an injection port sealing step (step S4) while the orientation of the cell is held constant. The sealing in this step is a temporary sealing. After electric charging (described below), the injection port (or the area near the port) will be unsealed in order to vent a gas generated during the electric charging. Final sealing is therefore performed after the gas venting.

In an impregnation step (step S5) that follows the injection port sealing step (step S4), the cell is allowed to stand for a prescribed period of time (e.g., several hours or several tens of hours) in order to allow sufficient permeation of the liquid electrolyte into the power generation element. The cell is then initially charged in step S6. The process then advances to subsequent steps, such as an aging step (not shown).

The sealing step (step S2), which is a main step of the present invention, is described next.

Figure 2:
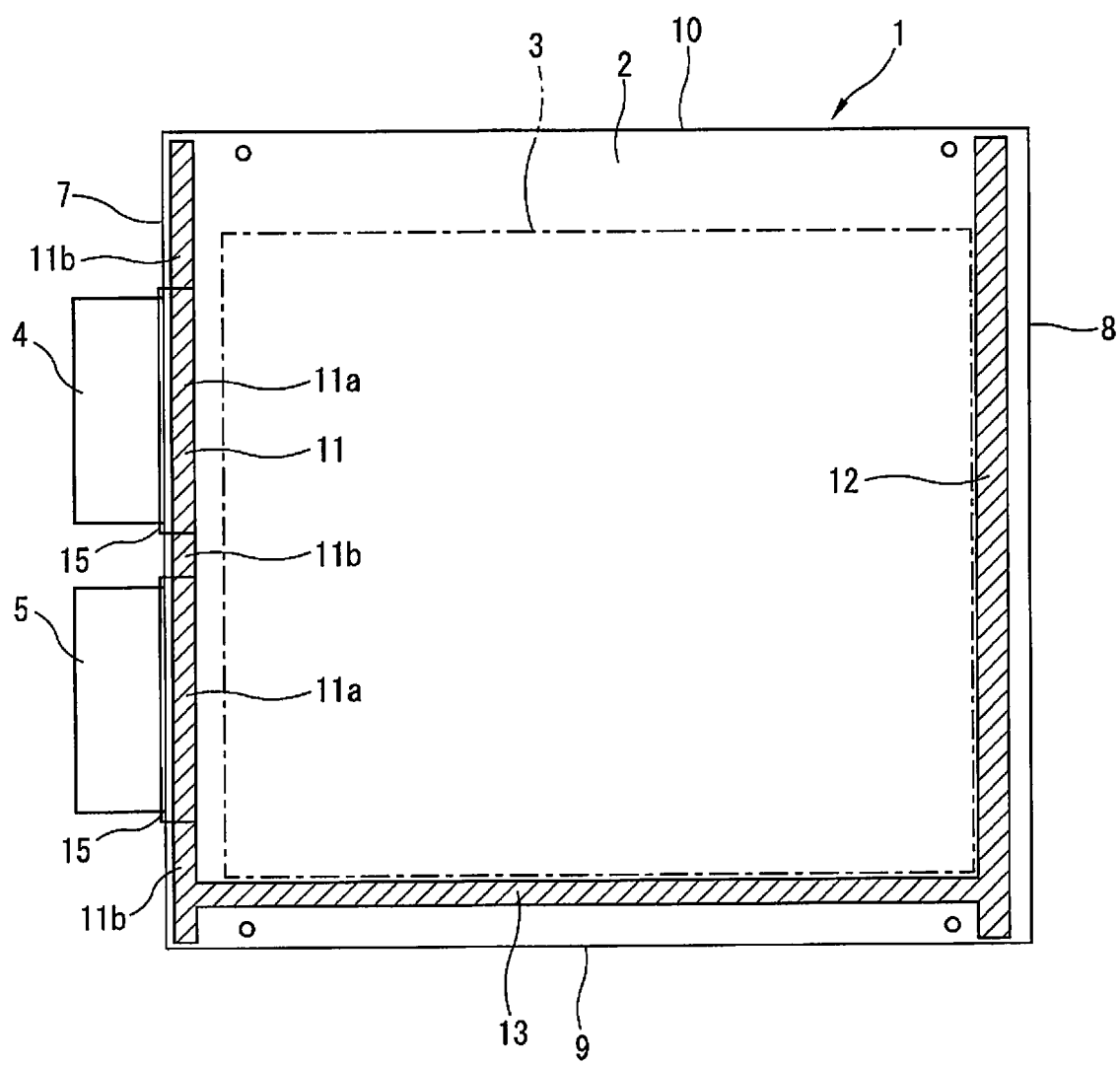
FIG. 2 is a front view of a cell that has passed through a sealing step.

FIG. 2 shows the cell 1 that has passed through the sealing step. The power generation element (layered electrode assembly) 3, shown by imaginary lines, is housed in the casing 2 made of lamination films, as described above. The power generation element 3 is provided with a positive electrode tab 4 and a negative electrode tab 5 disposed so as to be aligned with each other. The casing 2 is configured in a rectangular shape having four sides; specifically, a first side 7 from which the positive electrode tab 4 and negative electrode tab 5 (also referred to collectively as "electrode tabs") extend out from, a second side 8 opposite the first side 7, a third side 9 connecting the first side 7 and the second side 8 on the negative-electrode-tab 5 side, and a fourth side 10 serving as an injection port.

In the sealing step, three of the sides 7, 8, 9, excluding the fourth side 10 that serves as the injection port, are heat-sealed using a pair of heat blocks. In FIG. 2, narrow band-shaped seal lines 11, 12, 13 configured by thermal fusion in which the heat blocks are used are shown using diagonal lines. These three seal lines 11, 12, 13 extend in a substantially linear manner and intersect each other at end parts thereof to constitute a continuous seal line. The seal line 12 on the second side 8 and the seal line 13 on the third side 9 join the lamination films together. By contrast, the seal line 11 on the first side 7 is continuously set so as to form a single straight line traversing the positive electrode tab 4 and negative electrode tab 5, and the two lamination films are joined in a configuration in which the positive electrode tab 4 and negative electrode tab 5 are sandwiched therebetween.

Specifically, the seal line 11 on the first side 7 has two regions (referred to as "tab regions") 11a in which the electrode tabs 4, 5 and the lamination films are superposed, and three regions (referred to as "non-tab regions") 11b in which the lamination films are joined together without being superposed onto the electrode tabs 4, 5. These regions are continuous and constitute a single long and thin band-shaped seal line 11. More specifically, synthetic resin layers referred to as "pre-applied resin" are provided in advance in a band shape on the surfaces of the electrode tabs 4, 5 so as to correspond to portions intersected by the seal line 11, and the thermal fusion layers of the lamination films are joined on the synthetic resin layers in the tab regions 11a. In this working example, two band-shaped polypropylene films are bonded to the surfaces of the electrode tabs 4, 5 so as to hold the electrode tabs 4, 5 from both sides of the electrode tabs 4, 5, whereby pre-applied resin 15 is formed and the seal line 11 extends across and above the pre-applied resin 15, as shown in FIG. 2.

A step for sealing the tab regions 11a (tab-region sealing step) and a step for sealing the non-tab regions (non-tab-region sealing step) are separately performed using tab-region heat blocks and non-tab-region heat blocks (described below), respectively.

Figure 3:
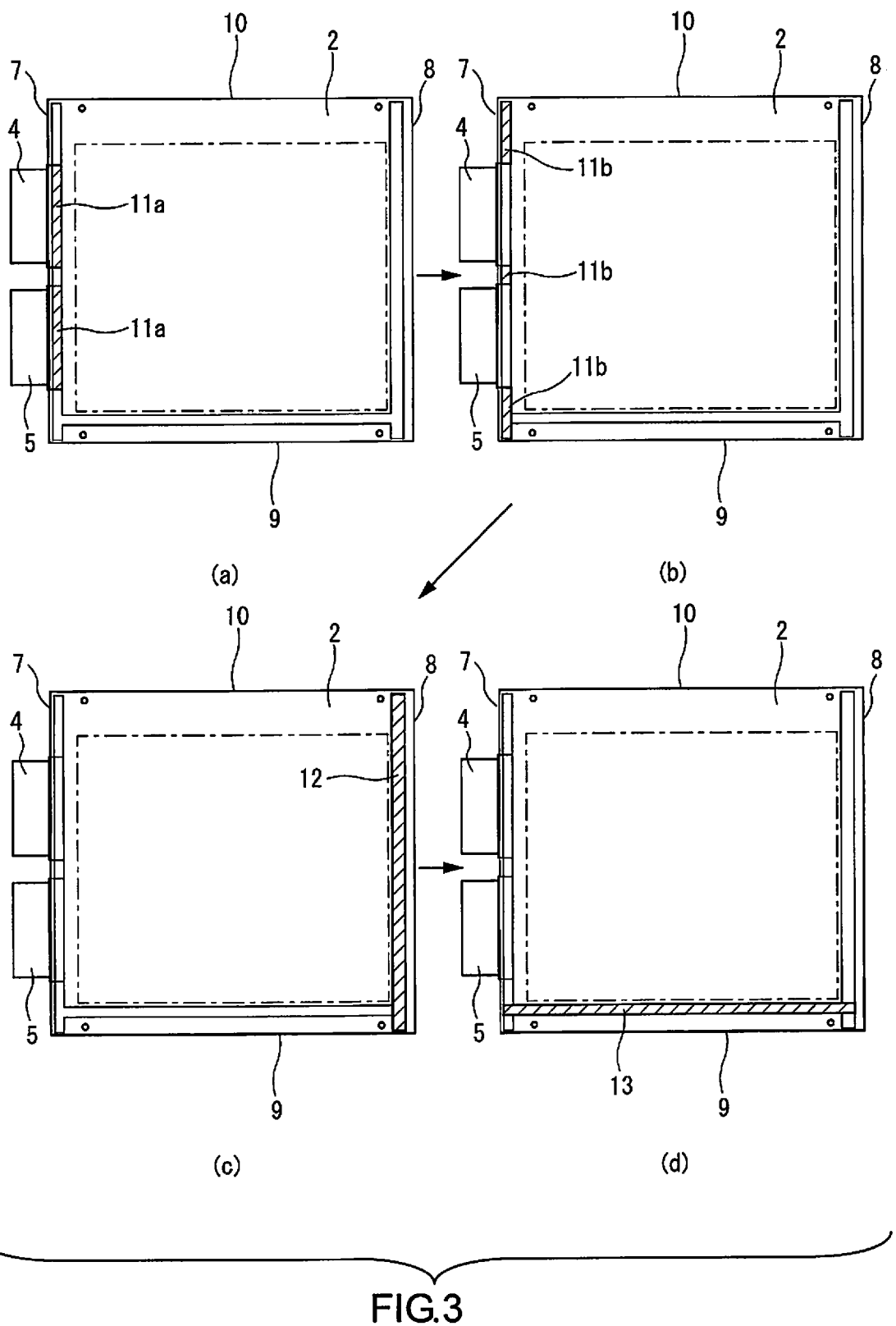
FIG. 3 is a process diagram illustrating the sealing step.

FIG. 3 shows one example of a sequence of specific steps for sealing the three seal lines 11, 12, 13 described above. In a first step (a), tab regions 11a at two locations superposed onto each of the positive electrode tab 4 and the negative electrode tab 5 are sealed. This step is performed by heating while applying pressure at a temperature and pressure that are suited to joining of the lamination films and the electrode tabs 4, 5 (specifically, the pre-applied resin 15 on the surfaces thereof) using a pair of tab-region heat blocks configured so as to include the two tab regions 11a.

In a subsequent step (b), non-tab regions 11b at three locations not superposed onto the electrode tabs 4, 5 within the seal line 11 are sealed. This step is performed by heating while applying pressure at a temperature and pressure that are suited to joining of the lamination films using a pair of non-tab-region heat blocks configured to include the three tab regions 11b. Through step (a) and step (b), the seal line 11 formed along the first side 7 intersecting the electrode tabs 4, 5 is completed in a sealed state.

In a subsequent step (c), the seal line 12 formed along the second side 8 is sealed. This step is performed by heating while applying pressure at a temperature and pressure that are suited to joining of the lamination films using a pair of heat blocks having shapes that correspond to the seal line 12. Because the seal line 12 and the seal line 11 do not intersect, the sealing of the non-tab regions 11b in step (b) and the sealing of the seal line 12 in step (c) can be performed at substantially the same time for a single cell 1.

In a subsequent step (d), the seal line 13 formed along the third side 9, which serves as a bottom side during liquid supply, is sealed. This step is performed by heating while applying pressure at a temperature and pressure that are suited to joining of the lamination films using a pair of heat blocks having shapes that correspond to the seal line 13. Two end parts of the seal line 13 extend to positions that intersect end parts of the seal line 11 and the seal line 12, whereby the casing 2, i.e., the lamination films are configured in a bag shape.

The heat blocks used in each of these steps all have a basic configuration in which a rod-shaped electrothermic heater (not shown) is incorporated into a copper main body part having a long and thin rectangular solid shape.

Figure 4A:
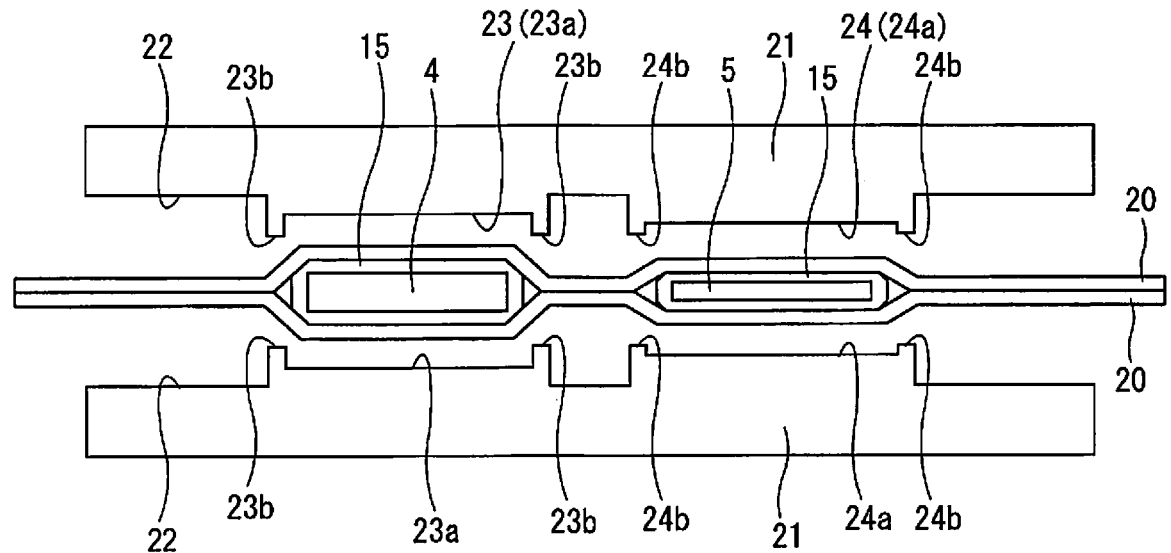
FIG. 4 is a diagram of a process for sealing tab regions.
Figure 4B:
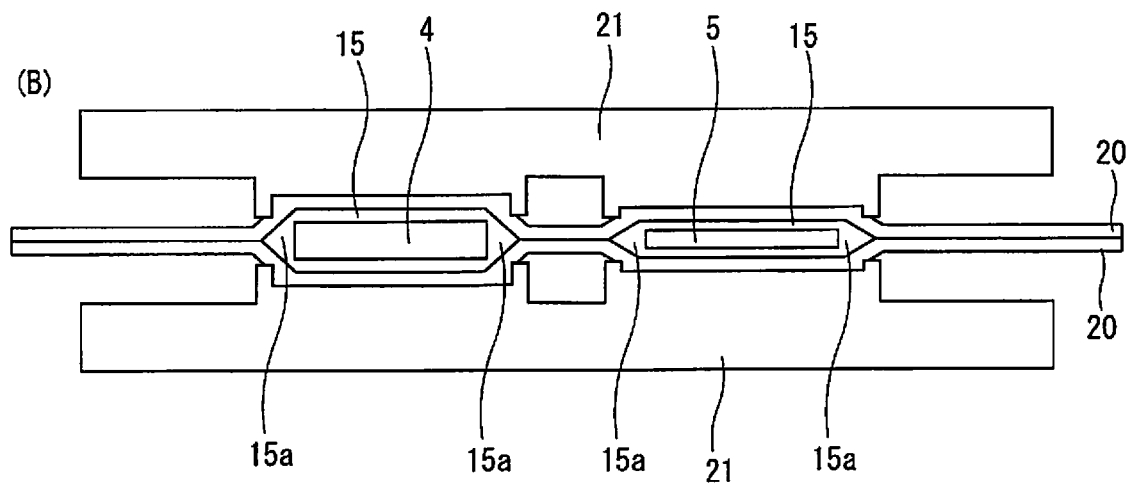
Figure 5:
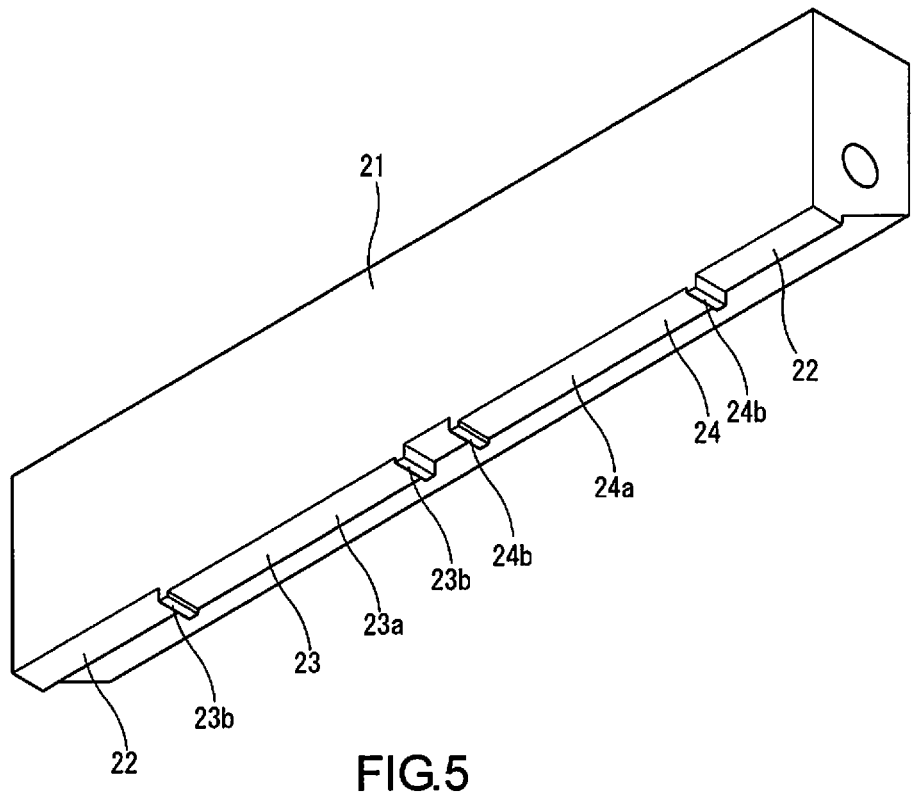
FIG. 5 is a perspective view of a tab-region heat block.

FIG. 4 is a diagram of a process for sealing the tab regions 11a in step (a). In FIG. 4, a pair of tab-region heat blocks 21 are used that hold two lamination films 20 together with the electrode tabs 4, 5 from both sides along the seal line 11. FIG. 4(A) shows a state in which the pair of tab-region heat blocks 21 are open, and FIG. 4(B) shows a state in which pressure and/or heat is applied by the pair of tab-region heat blocks 21. The dimensional relationship, etc., among the parts in the diagram shown in FIG. 4 are not necessarily accurate. FIG. 5 is a perspective view showing the general shape of a tab-region heat block 21. The pair of tab-region heat blocks 21 constitute a substantially symmetrical shape and are formed in a configuration in which two processing parts 23, 24 that respectively correspond to the two tab regions 11a protrude from a reference surface 22 that is set so as to avoid contact with the surfaces of the lamination films 20. The processing part 23 that corresponds to the positive electrode tab 4 protrudes by an amount corresponding to the thickness of the positive electrode tab 4, and the processing part 24 that corresponds to the negative electrode tab 5 protrudes by an amount corresponding to the thickness of the negative electrode tab 5. The two protrusion amounts differ from each other because the positive electrode tab 4 and the negative electrode tab 5 have mutually different thicknesses. As an example, the thicknesses of the positive electrode tab 4 and the negative electrode tab 5 alone are about 0.4 mm and 0.2 mm, respectively, and the thicknesses including the pre-applied resin 15 are about 0.7 mm and 0.4 mm, respectively. Furthermore, the processing part 23 more specifically is provided with a main processing surface 23a for applying heat and/or pressure to the lamination films 20 superposed onto the positive electrode tab 4, and auxiliary processing surfaces 23b provided so as to protrude further by a very small amount from the main processing surface 23a at both end parts of the main processing surface 23a. The main processing surface 23a is very slightly wider than the positive metal electrode tab 4, and the auxiliary processing surfaces 23b are provided at positions superposed onto projections 15a (see FIG. 4(B)) of the pre-applied resin 15 that project laterally from the positive metal electrode tab 4. In the same manner, the processing part 24 is provided with a main processing surface 24a for applying heat and/or pressure to the lamination films 20 superposed onto the negative electrode tab 5, and auxiliary processing surfaces 24b provided so as to protrude further by a very small amount from the main processing surface 24a at both end parts of the main processing surface 24a. The main processing surface 24a is very slightly wider than the negative metal electrode tab 5, and the auxiliary processing surfaces 24b are provided at positions superposed onto projections 15a (see FIG. 4(B)) of the pre-applied resin 15 that project laterally from the negative metal electrode tab 5.

In the step for sealing the tab regions 11a, the tab-region heat blocks 21 are used to apply pressure and/or heat from both sides of the lamination films 20 together with the electrode tabs 4, 5, as shown in FIG. 4(B). The lamination films 20 are thereby joined to the surfaces of the metal electrode tabs 4, 5 via the pre-applied resin 15. As a result of pressure being applied to the entirety of the pre-applied resin 15 by the main processing surfaces 23a, 24a, parts of the softened pre-applied resin 15 stretch laterally as the projections 15a, and edges of distal ends of the projections 15a are compressed by the lamination films 20 and the auxiliary processing surfaces 23b, 24b. Specifically, pressure and/or heat is applied by the auxiliary processing surfaces 23b, 24b to a periphery of a boundary between two portions of differing thicknesses near the electrode tabs 4, 5, the portions including portions where merely the two lamination films 20 are superposed and portions where the projections 15a of the pre-applied resin 15 are interposed between the two lamination films 20.

Figure 6:
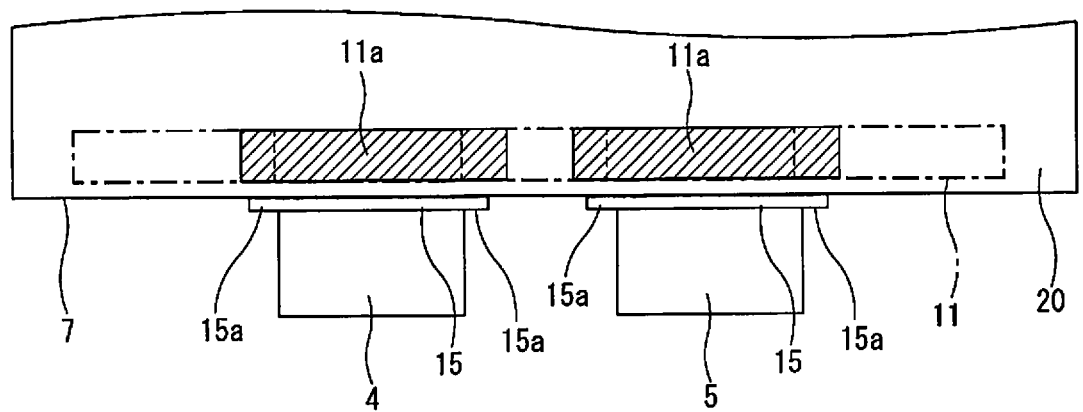
FIG. 6 is a diagram showing tab regions that have been sealed.

The step for sealing the tab regions 11a shown using diagonal lines in FIG. 6 is thus completed. In the step for sealing the tab regions 11a, pressure and/or heat is applied at a comparatively high temperature, e.g., about 230° C., and for a comparatively long time, e.g., about six seconds, in consideration of the high thermal capacity of the electrode tabs 4, 5 as well as the transfer of heat through the metal electrode tabs 4, 5 to, inter alia, the current collectors within the power generation element 3. The pressure applied during processing is also set comparatively high; for example, a pressure of about 7 MPa is imparted to the tab-region heat blocks 21. Only the tab regions 11a superposed onto the electrode tabs 4, 5 are thus sealed under optimal processing conditions, resulting in reliable sealing of the electrode tabs 4, 5 and the lamination films 20.

Figure 7A:
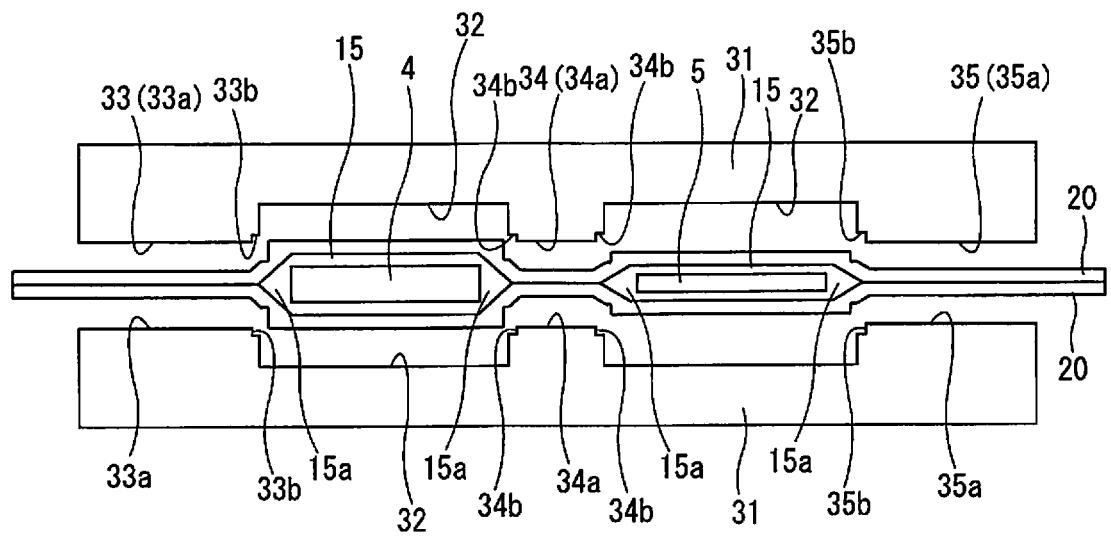
FIG. 7 is a diagram of a process for sealing non-tab regions.
Figure 7B:
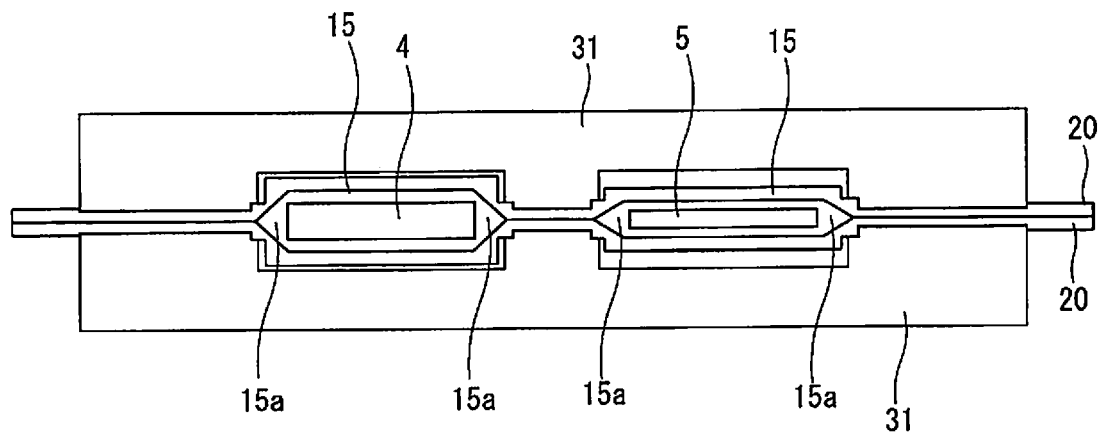
Figure 8:
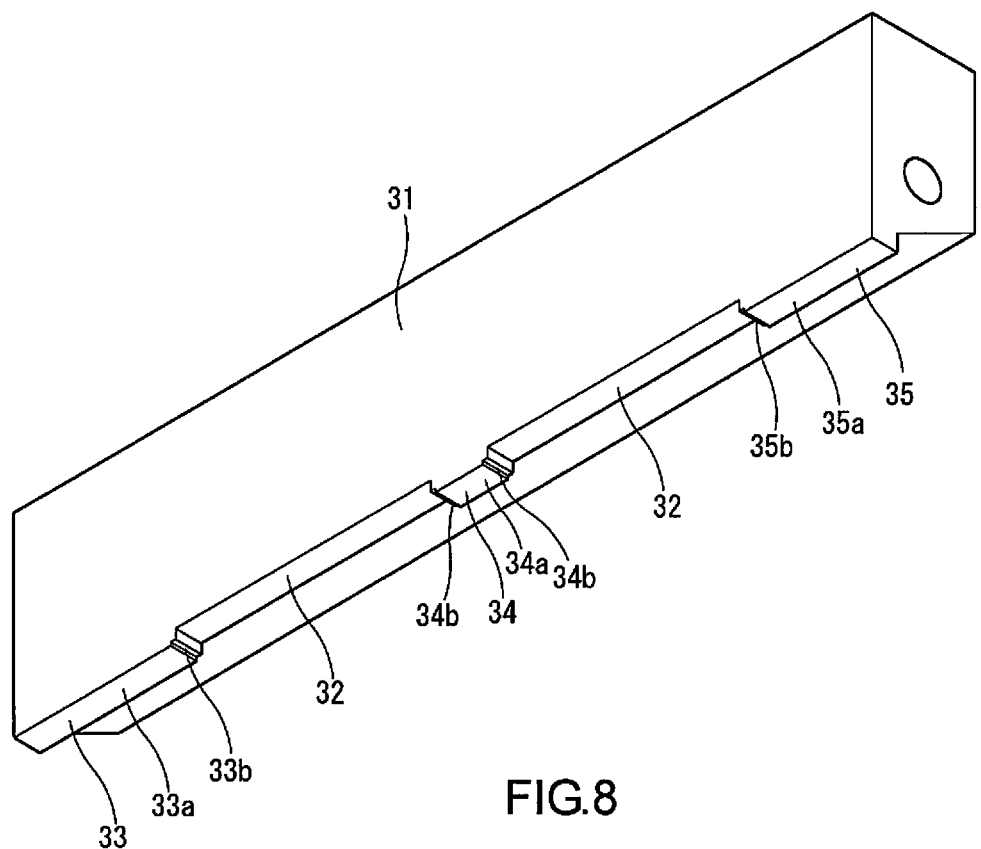
FIG. 8 is a perspective view of a non-tab-region heat block.

FIG. 7 is a diagram of a process for sealing the non-tab regions 11b in step (b) shown in FIG. 3. In this process, a pair of non-tab-region heat blocks 31 are used that hold the two lamination films 20 from both sides along the seal line 11. FIG. 7(A) shows a state in which the pair of non-tab-region heat blocks 31 are open, and FIG. 7(B) shows a state in which pressure and/or heat is applied by the pair of non-tab-region heat blocks 31. FIG. 8 is a perspective view showing the general shape of a non-tab-region heat block 31. The pair of non-tab-region heat blocks 31 constitute a substantially symmetrical shape and are formed in a configuration in which three processing parts 33, 34, 35 that respectively correspond to the three non-tab regions 11b protrude from a reference surface 32 that is set so as to avoid contact with the surfaces of the lamination films 20. These three processing parts 33, 34, 35 all protrude by equal amounts. Furthermore, the processing parts 33, 34, 35 more specifically are provided with main processing surfaces 33a, 34a, 35a for applying heat and/or pressure to the lamination films 20, and auxiliary processing surfaces 33b, 34b, 35b provided so as to recede by a very small amount from the main processing surfaces 33a, 34a, 35a at end parts of the main processing surfaces 33a, 34a, 35a. The main processing surfaces 33a, 34a, 35a are provided so as not to be superposed onto the projections 15a of the pre-applied resin 15 in the non-tab regions 11b, and the auxiliary processing surfaces 33b, 34b, 35b are provided at positions superposed onto the edges of the distal ends (i.e., the boundary between joining surfaces of the two lamination films 20) of the projections 15a of the pre-applied resin 15 that project laterally from the metal electrode tabs 4, 5. In particular, the auxiliary processing surfaces 23b, 24b of the tab-region heat blocks 21 used during the step for sealing the tab regions 11a, and the auxiliary processing surfaces 33b, 34b, 35b of the non-tab-region heat blocks 31 are configured so as to overlap each other at the edges of the distal ends of the projections 15a.

In the step for sealing the non-tab regions 11b, the non-tab-region heat blocks 31 are used to apply pressure and/or heat from both sides of the two lamination films 20 not superposed onto the electrode tabs 4, 5, as shown in FIG. 7(B). The two lamination films 20 are thereby joined together. Pressure and/or heat is re-applied by the auxiliary processing surfaces 33b, 34b, 35b to the vicinity of the edges of the distal ends of the projections 15a of the pre-applied resin 15 and to the lamination films 20, the projections 15a of the pre-applied resin 15 having already been fused due to the step for sealing the tab regions 11a. Specifically, the regions to which pressure and/or heat is applied by the tab-region heat blocks 21 and the regions to which pressure and/or heat is applied by the non-tab-region heat blocks 31 slightly overlap, the overlap regions being positioned on the edges of the distal ends of the projections 15a.

According to one example, whereas the auxiliary processing surfaces 23b, 24b of the tab-region heat blocks 21 have a width of about 2 mm, the auxiliary processing surfaces 33b, 34b, 35b of the non-tab-region heat blocks 31 have a width of about 1 mm. The two sets of auxiliary processing surfaces overlap by an amount corresponding to the width of the auxiliary processing surfaces 33b, 34b, 35b of the non-tab-region heat blocks 31 (i.e., about 1 mm). The seal line 11 is continuously sealed in a reliable manner because of such overlapping between the regions processed in the process for sealing the tab regions and the regions processed in the process for sealing the non-tab regions. Moreover, the auxiliary processing surfaces 23b, 24b of the tab-region heat blocks 21 slightly protrude from the main processing surfaces 23a, 24a, and the auxiliary processing surfaces 33b, 34b, 35b of the non-tab-region heat blocks 31 slightly recede from the main processing surfaces 33a, 34a, 35a. This accommodates a difference in level between the portions where merely the two lamination films 20 are superposed near the electrode tabs 4, 5 and the portions where the projections 15a of the pre-applied resin 15 are interposed between the two lamination films 20.

Figure 9:
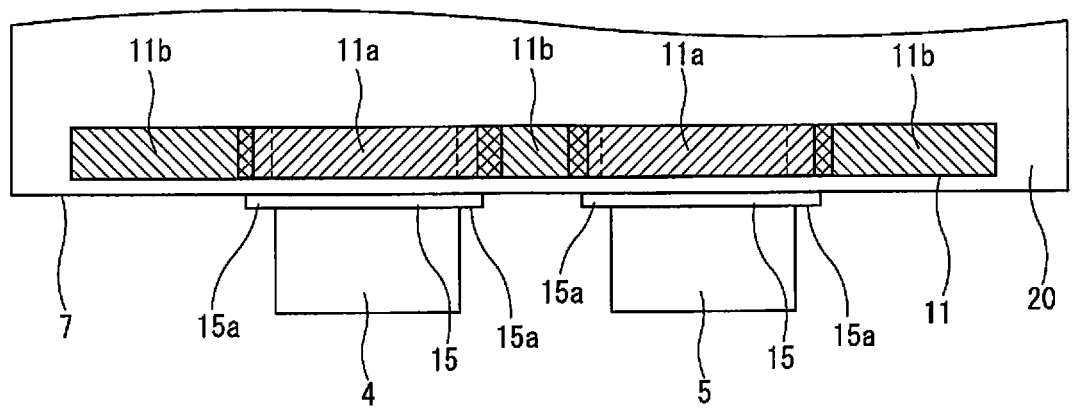
FIG. 9 is a diagram showing non-tab regions that have been sealed.

The step for sealing the non-tab regions 11b shown using diagonal lines in FIG. 9 is thus completed. In the step for sealing the non-tab regions 11b, pressure and/or heat is applied at a comparatively low temperature, e.g., about 200° C., and for a comparatively short time, e.g., about one to two seconds, in consideration of there being no absorption of heat by the electrode tabs 4, 5 and the lamination films 20 being thermally fused in a comparatively easy manner. The pressure applied during processing is also set comparatively low; for example, a pressure of about 1 MPa is imparted to the non-tab-region heat blocks 31. The non-tab regions 11b not superposed onto the electrode tabs 4, 5 are thus sealed under optimal processing conditions different from those for the tab regions 11a, resulting in excellent sealing of the lamination films 20 without application of excessive heat.

The regions in the process for sealing the non-tab regions 11b are continuous with the regions in the previously performed process for sealing the tab regions 11a, as shown in FIG. 9. A single, continuous seal line 11 is therefore obtained. This makes it possible to ensure excellent sealing quality of the entire seal line 11.

In step (c) and step (d) in FIG. 3, the lamination films 20 are joined together in the same manner as with the non-tab regions 11b, and therefore the sealing process can be performed under the same processing conditions as those in the process for sealing the non-tab regions 11b.

As described above, the process for sealing the seal line 12 in step (c) can be performed at substantially the same time as the process for sealing the non-tab regions 11b.

Thus, according to the sealing method in this working example, the tab regions 11a and the non-tab regions 11b for the seal line 11 traversing the electrode tabs 4, 5 can be sealed under individual optimal conditions (temperature, pressure, time, etc.), and high sealing quality can be obtained overall. Specifically, applying pressure and/or heat using a heat block to the tab regions 11a and non-tab regions 11b at the same time to thermally fuse these regions, as in the past, makes it impossible to separately set processing conditions such as temperature, pressure, and time. Therefore, compromises must be made in regard to the sealing conditions for sealing these regions, and sealing quality readily decreases. In addition, when pressure and/or heat is applied to the tab regions 11a and non-tab regions 11b at the same time, the heat block used will have a difference in level between processing surfaces for the tab regions 11a and processing surfaces for the non-tab regions 11b, the difference in level corresponding to the thickness of the electrode tabs 4, 5. However, a change in thickness that accompanies softening and fusing of the resin layers during processing will be different for the tab regions 11a and non-tab regions 11b even if the difference in level is suitably set, and therefore a substantial pressure-bearing area will fluctuate during processing and suitable raised pressure will be impossible to maintain. In this working example, it is possible to also inhibit changes in pressurization caused by such changes in the substantial pressure-bearing area.

In this working example, the tab regions 11a are sealed first and the non-tab regions 11b are subsequently sealed in accordance with the sequence of steps (a) and (b) in FIG. 3. However, this sequence of steps can be reversed.

FIGS. 10 to 13 show a second working example in which the non-tab regions 11b are sealed first and the tab regions 11a are subsequently sealed in accordance with the reversed sequence.

Figure 10A:
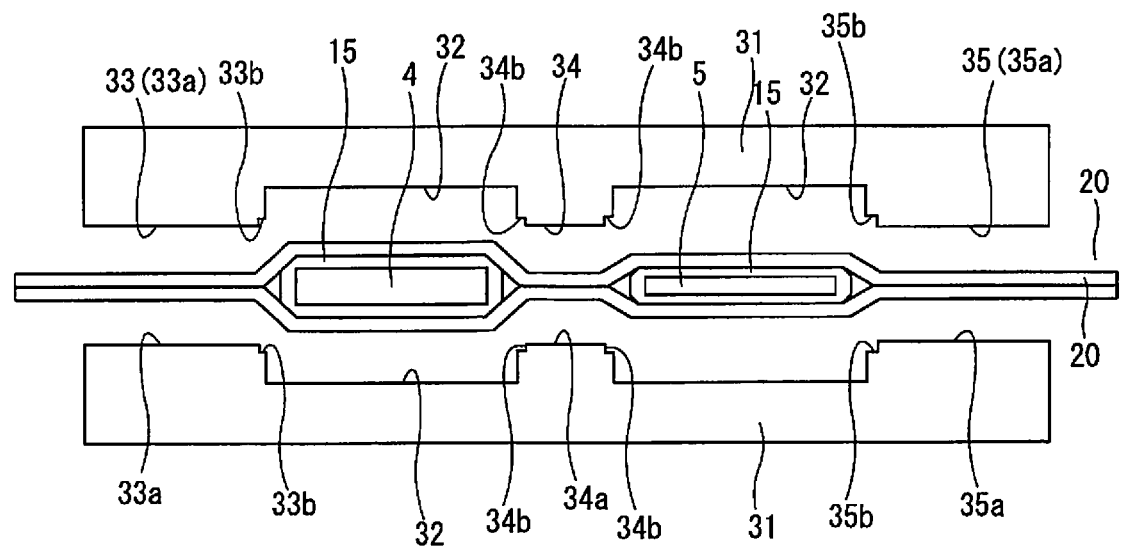
FIG. 10 is a diagram of a process for sealing non-tab regions according to a second working example.
Figure 10B:
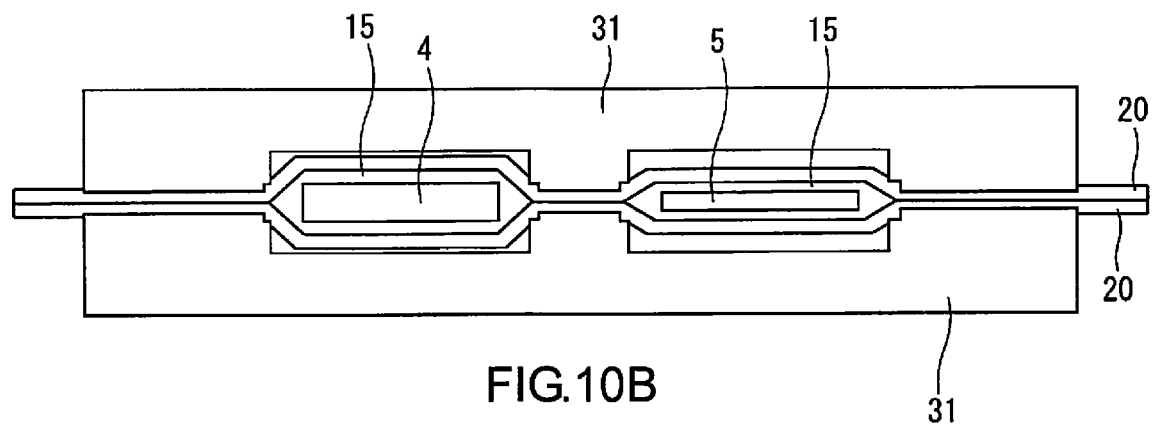
Figure 11:
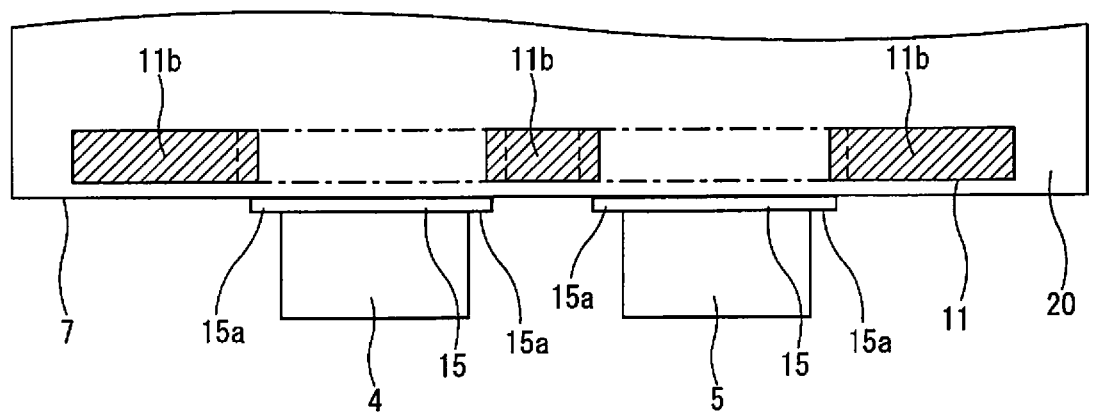
FIG. 11 is a diagram showing non-tab regions that have been sealed.

FIG. 10 is a diagram of a process for sealing the non-tab regions 11b that is performed first. FIG. 10(A) shows a state in which the pair of non-tab-region heat blocks 31 are open, and FIG. 10(B) shows a state in which pressure and/or heat is applied by the pair of non-tab-region heat blocks 31. Specifically, the non-tab-region heat blocks 31 having the configuration described above are used to seal the non-tab regions 11b. The step for sealing the non-tab regions 11b shown using diagonal lines in FIG. 11 is thereby completed. In the step for sealing the non-tab regions 11b, in the same manner as in the working example described above, pressure and/or heat is applied at a comparatively low temperature, e.g., about 200° C., and for a comparatively short time, e.g., about 1 to 2 seconds, in consideration of there being no absorption of heat by the electrode tabs 4, 5 and the lamination films 20 being thermally fused in a comparatively easy manner. The pressure applied during processing is also set comparatively low; for example, a pressure of about 1 MPa is imparted to the non-tab-region heat blocks 31. Only the non-tab regions 11b not superposed onto the electrode tabs 4, 5 are thus sealed under optimal processing conditions different from those for the tab regions 11a, resulting in excellent sealing of the lamination films 20 without application of excessive heat.

The auxiliary processing surfaces 33b, 34b, 35b provided to the non-tab-region heat blocks 31 apply pressure and/or heat to areas superposed onto edges of the distal ends (i.e., the boundary between joining surfaces of the two lamination films 20) of projections 15a of the pre-applied resin 15 that project laterally from the metal electrode tabs 4, 5.

Figure 12A:
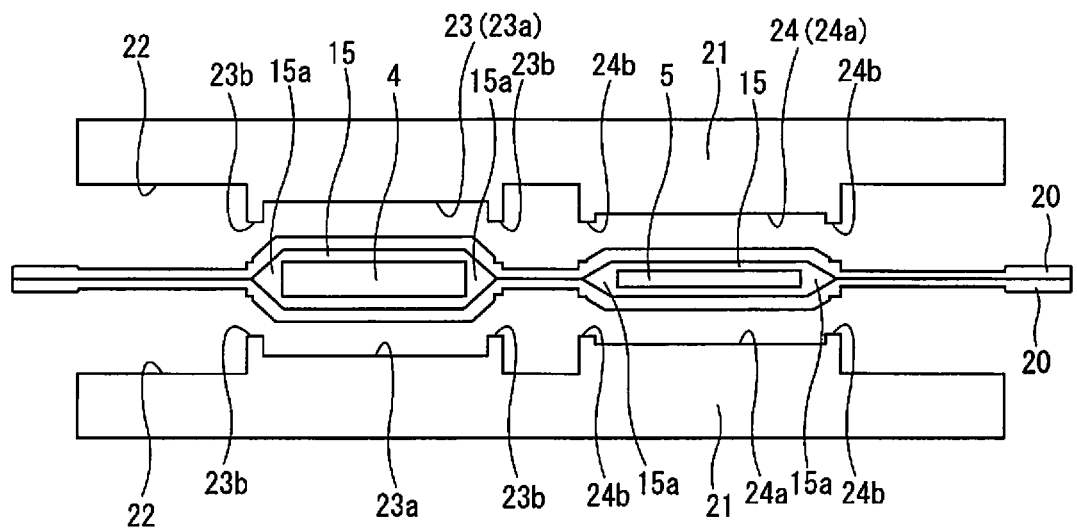
FIG. 12 is a diagram of a process for sealing tab regions according to the second working example.
Figure 12B:
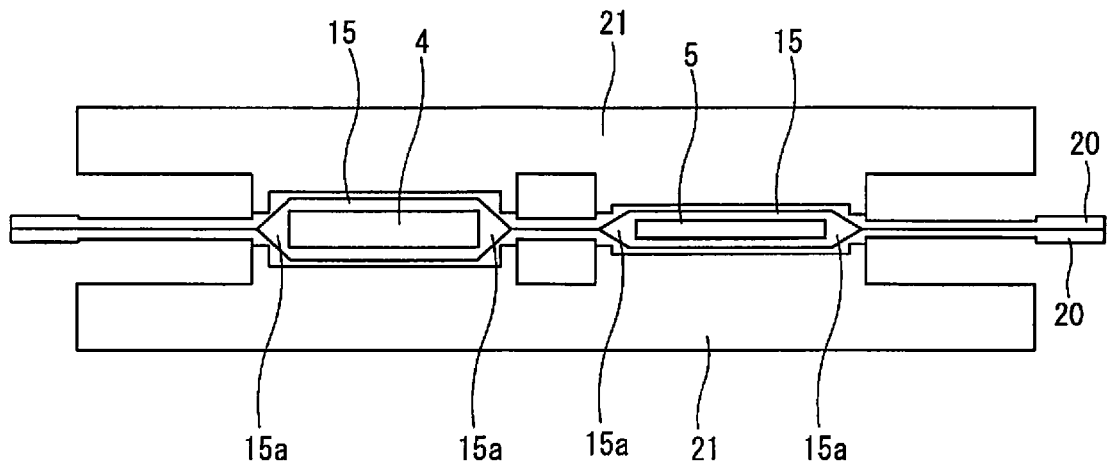
Figure 13:
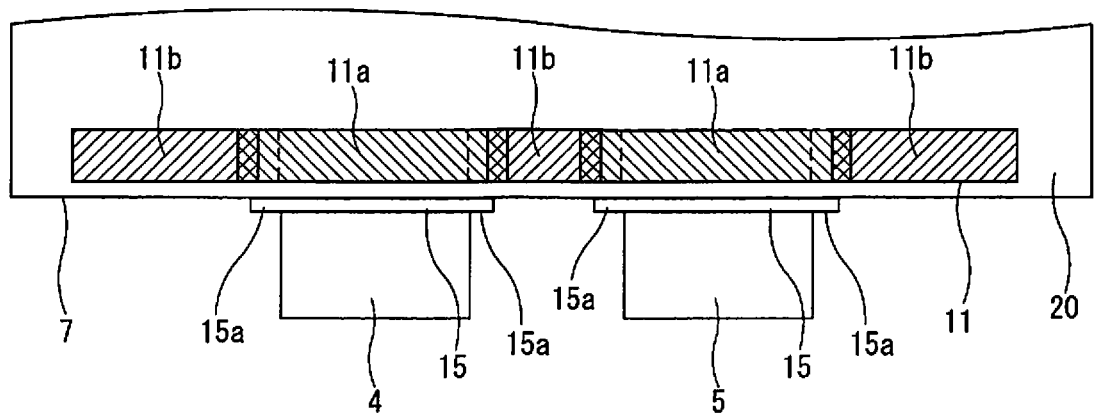
FIG. 13 is a diagram showing tab regions that have been sealed.

FIG. 12 is a diagram of a process for sealing the tab regions 11a performed after sealing of the non-tab regions 11b. FIG. 12(A) shows a state in which the pair of tab-region heat blocks 21 are open, and FIG. 12(B) shows a state in which pressure and/or heat is applied by the pair of tab-region heat blocks 21. Specifically, the tab-region heat blocks 21 having the configuration described above are used to seal the tab regions 11a. The step for sealing the tab regions 11b shown using diagonal lines in FIG. 13 is thereby completed. In the step for sealing the tab regions 11a, in the same manner as in the working example described above, pressure and/or heat is applied at a comparatively high temperature, e.g., about 230° C., and for a comparatively long time, e.g., about six seconds, in consideration of the high thermal capacity of the electrode tabs 4, 5 as well as the transfer of heat through the metal electrode tabs 4, 5 to, inter alia, the current collectors within the power generation element 3. The pressure applied during processing is also set comparatively high; for example, a pressure of about 7 MPa is imparted to the tab-region heat blocks 21. Only the tab regions 11a superposed onto the electrode tabs 4, 5 are thus sealed under optimal processing conditions, resulting in reliable sealing of the electrode tabs 4, 5 and the lamination films 20.

The auxiliary processing surfaces 23b, 24b provided to the tab-region heat blocks 21 apply pressure and/or heat to areas superposed onto the edges of the distal ends of the projections 15a of the pre-applied resin 15 that project laterally from the metal electrode tabs 4, 5. In the same manner as in the working example described above, the regions to which pressure and/or heat is applied by the auxiliary processing surfaces 23b, 24b and the regions to which pressure and/or heat is applied by the auxiliary processing surfaces 33b, 34b, 35b of the non-tab-region heat blocks 31 partially overlap, whereby the seal line 11 is configured such that the tab regions 11a and the non-tab regions 11b are reliably continuous.

Because the process for sealing the non-tab regions 11b, which have a relatively low heating temperature, is performed first in the second working example in which the process for sealing the non-tab regions 11b is performed first in this manner, an advantage is presented in that the thermal fusion layers of the tab regions 11a that are to be subsequently heated are not unnecessarily heated.

The step for sealing the non-tab regions 11b shown in FIGS. 10 and 11 can be performed at substantially the same time as the step for sealing the seal line 12 in step (c) of FIG. 3.

Figure 14:
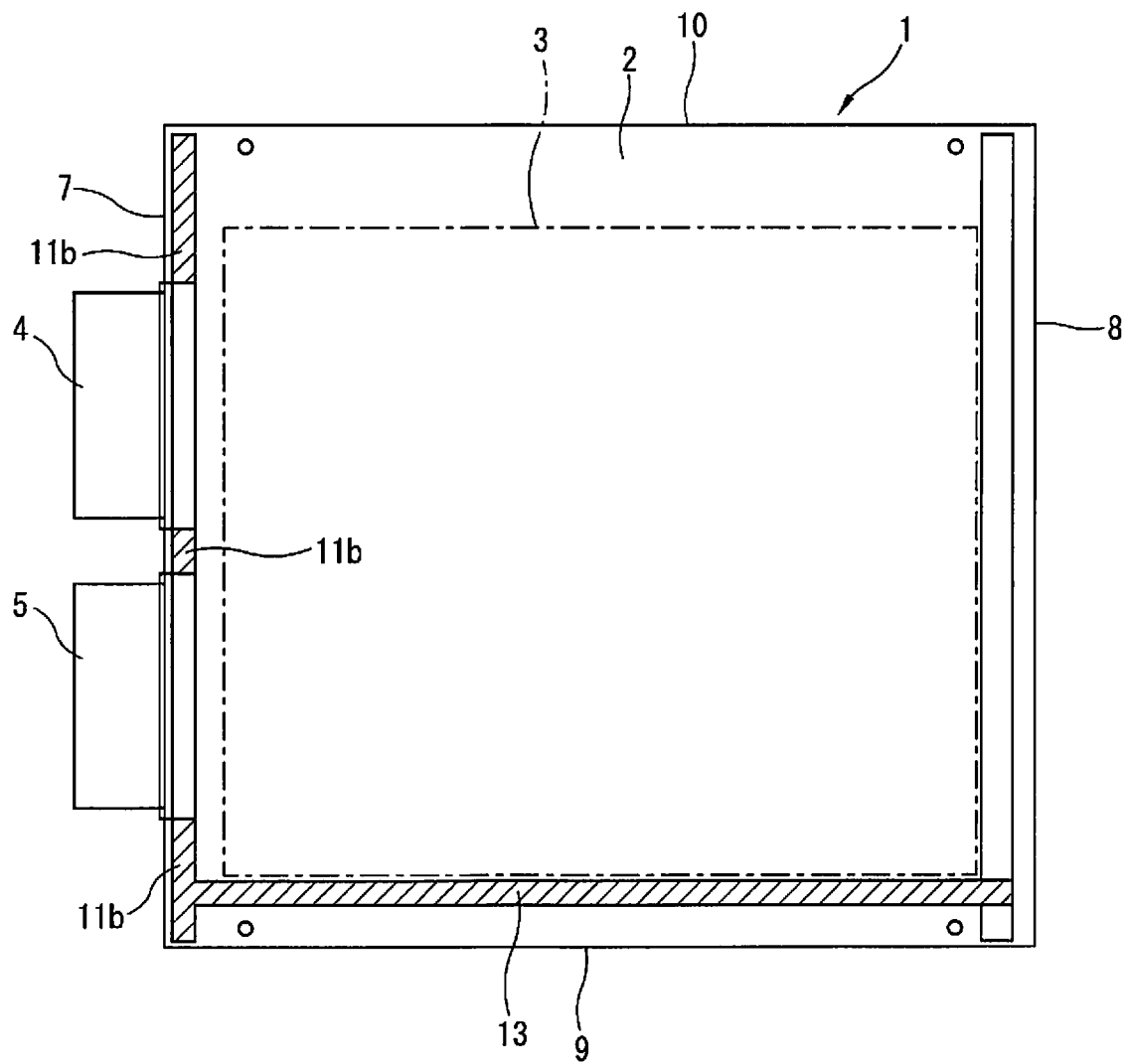
FIG. 14 is a diagram showing a sealing-process region that includes non-tab regions according to a third working example.
Figure 15:
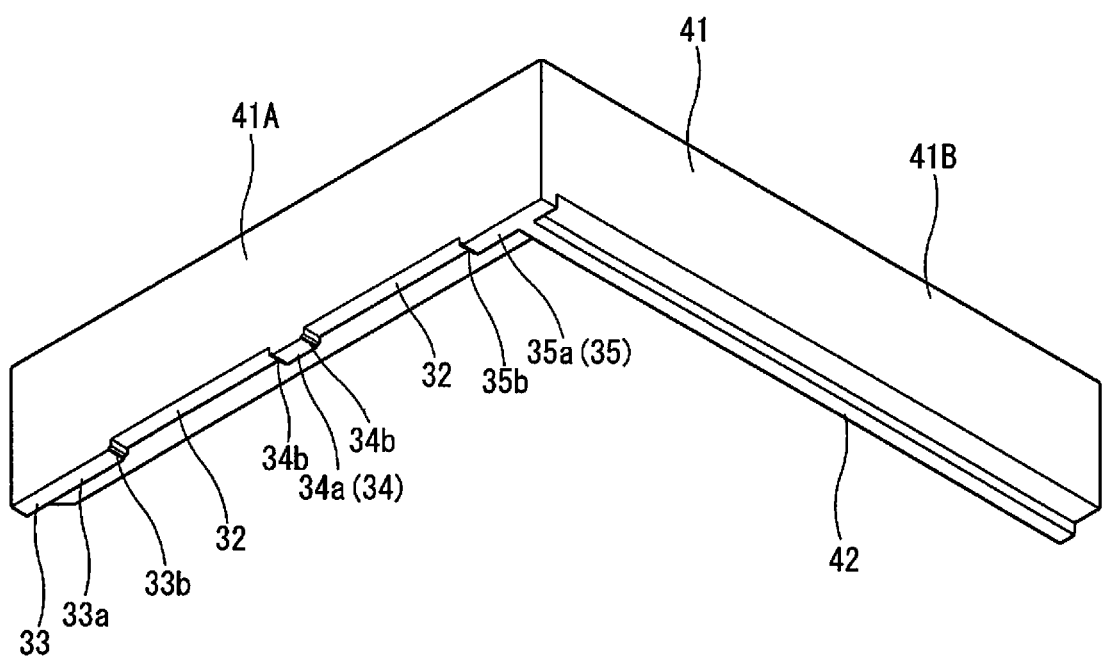
FIG. 15 is a perspective view of a non-tab-region heat block used in the third working example.

FIGS. 14 and 15 show a third working example in which a process for sealing the non-tab regions 11b is performed at the same time as a process for sealing the seal line 13 formed along the third side 9, which serves as a bottom side during liquid supply. In this working example, a pair of L-shaped heat blocks 41 having a configuration such as is shown in FIG. 15 are used during the process for sealing the non-tab regions 11b. In the L-shaped heat blocks 41, a linear first heat block part 41A formed along the first side 7 and a linear second heat block part 41B formed along the third side 9 are integrally formed in such a configuration as to be continuous at an angle of 90°. The first heat block part 41A has basically the same configuration as the non-tab-region heat blocks 31 described above, and has three processing parts 33, 34, 35 that correspond to the non-tab regions 11b. The second heat block part 41B is provided with a linearly continuous processing part 42.

Through use of such L-shaped heat blocks 41, the seal line 13 and the non-tab regions 11b within the seal line 11 are sealed at the same time, as shown using diagonal lines in FIG. 14.

Performing the process for sealing the non-tab regions 11b at the same time as the process for sealing the seal line 13 or the seal line 12, which are on other sides, in this manner makes it possible to shorten a cycle time. Specifically, increases in cycle time accompanying separate performance of the process for sealing the tab regions 11a and the process for sealing the non-tab regions 11b can be suppressed to a minimum.

The processing time required for separately sealing only the tab regions 11a typically is shorter than the processing time required for sealing the tab regions 11a and the non-tab regions 11b at the same time by the same heat block as in previous methods. Therefore, the overall sealing process can also have a shorter cycle time than in previous methods.

In each of the examples described above, the process for sealing the tab region 11a corresponding to the positive electrode tab 4 and the process for sealing the tab region 11a corresponding to the negative electrode tab 5 for the seal line 11 on the first side 7 are performed at the same time. However, these two sealing processes may furthermore be performed as separate steps using separate heat blocks. As described above, the thicknesses and types of materials in the positive electrode tab 4 and negative electrode tab 5 differ from each other; however, if the electrode tabs 4, 5 are sealed in separate steps, it is possible to perform sealing under individually optimized processing conditions.

The invention claimed is:

1. A method for producing a film-covered battery having a power generation element obtained by layering a plurality of positive electrodes and negative electrodes using an interposed separator and housed together with a liquid electrolyte in a casing made of lamination films provided with a thermal fusion layer, and electrode tabs of the power generation element extend out from joining surfaces of the lamination films, the method comprising separately performing the following steps in which the lamination films are thermally fused and a bag-shaped casing is configured before liquid electrolyte is supplied:
   a tab-region sealing step in which tab regions at which the lamination films and the electrode tabs are superposed are heat-sealed using tab-region heat blocks, the tab regions being disposed partway along a seal line continuously set across the electrode tabs on a side of the casing where at least one of the electrode tabs is disposed; and
   a non-tab-region sealing step in which non-tab regions at which the lamination films are joined together without being superposed onto the electrode tabs are heat-sealed using non-tab-region heat blocks that do not contact the tab regions, the non-tab regions being disposed partway along the seal line,
   the non-tab-region sealing step being performed after the tab-region sealing step is performed.

2. The method according to claim 1, wherein
the tab-region sealing step is performed at a higher temperature than is the non-tab-region sealing step.

3. The method according to claim 1, wherein
the tab-region sealing step is performed at a higher pressure than is the non-tab-region sealing step.

4. The method according to claim 1, wherein
the non-tab-region sealing step is performed at the same time as a step for sealing another side on which no electrode tabs are disposed.

5. The method according to claim 1, wherein
synthetic resin layers are provided in advance to the electrode tabs in areas intersected by the seal line; and
regions processed in the non-tab-region sealing step and regions processed in the tab-region sealing step overlap each other at projections of the synthetic resin layers that project laterally from the electrode tabs.

6. The method according to claim 5, wherein
auxiliary processing surfaces that correspond to the projections are provided to the tab-region heat blocks so as to protrude from main processing surfaces that correspond to the electrode tabs; and
auxiliary processing surfaces that correspond to the projections are provided to the non-tab-region heat blocks so as to recede rom main processing surfaces that correspond to the lamination films.

7. A method for producing a film-covered battery having a power generation element obtained by layering a plurality of positive electrodes and negative electrodes using an interposed separator and housed together with a liquid electrolyte in a casing made of lamination films provided with a thermal fusion layer, and electrode tabs of the power generation element extend out from joining surfaces of the lamination films, the method comprising separately performing the following steps in which the lamination films are thermally fused and a bag-shaped casing is configured before liquid electrolyte is supplied:
   a tab-region sealing step in which tab regions at which the lamination films and the electrode tabs are superposed are heat-sealed using tab-region heat blocks, the tab regions being disposed partway along a seal line continuously set across the electrode tabs on a side of the casing where at least one of the electrode tabs is disposed; and
   a non-tab-region sealing step in which non-tab regions at which the lamination films are joined together without being superposed onto the electrode tabs are heat-sealed using non-tab-region heat blocks that do not contact the tab regions, the non-tab regions being disposed partway along the seal line,
synthetic resin layers being provided in advance to the electrode tabs in areas intersected by the seal line; and
regions processed in the non-tab-region sealing step and regions processed in the tab-region sealing step overlapping each other at projections of the synthetic resin layers that project laterally from the electrode tabs.

8. The method according to claim 7, wherein
the non-tab-region sealing step is performed after the tab-region sealing step is performed.

9. The method according to claim 7, wherein
the tab-region sealing step is performed after the non-tab-region sealing step is performed.

10. The method according to claim 7, wherein
the tab-region sealing step is performed at a higher temperature than is the non-tab-region sealing step.

11. The method according to claim 7, wherein
the tab-region sealing step is performed at a higher pressure than is the non-tab-region sealing step.

12. The method according to claim 7, wherein
the non-tab-region sealing step is performed at the same time as a step for sealing another side on which no electrode tabs are disposed.

13. The method according to claim 7, wherein
auxiliary processing surfaces that correspond to the projections are provided to the tab-region heat blocks so as to protrude from main processing surfaces that correspond to the electrode tabs; and
auxiliary processing surfaces that correspond to the projections are provided to the non-tab-region heat blocks so as to recede from main processing surfaces that correspond to the lamination films.

* * * * *